United States Patent
Wang et al.

(10) Patent No.: US 12,518,017 B2
(45) Date of Patent: Jan. 6, 2026

(54) ARTIFICIAL-INTELLIGENCE-ASSISTED CERTIFICATION SYSTEM

(71) Applicant: RTX Corporation, Farmington, CT (US)

(72) Inventors: Guoqiang Wang, Albany, CA (US); Zamira Angelica Daw Perez, Albany, CA (US); Massimiliano L. Chiodo, Oakland, CA (US); Timothy Ethan Wang, Reno, NV (US); Ryan James Melville, Enfield, CT (US); Saqib Hasan, Nolensville, TN (US); Isaac E. Amundson, Minneapolis, MN (US)

(73) Assignee: RTX CORPORATION, Farmington, CT (US)

( * ) Notice: Subject to any disclaimer, the term of this patent is extended or adjusted under 35 U.S.C. 154(b) by 140 days.

(21) Appl. No.: 18/520,061

(22) Filed: Nov. 27, 2023

(65) Prior Publication Data
US 2025/0173440 A1 May 29, 2025

(51) Int. Cl.
*G06F 21/57* (2013.01)
(52) U.S. Cl.
CPC .................... *G06F 21/57* (2013.01)
(58) Field of Classification Search
CPC ....... G06F 21/57; G06F 8/73; G06Q 10/0635; G06N 20/00
See application file for complete search history.

(56) References Cited

U.S. PATENT DOCUMENTS

| | | | | |
|---|---|---|---|---|
| 10,824,662 | B2* | 11/2020 | Martin | G06F 16/2365 |
| 11,720,385 | B2* | 8/2023 | Urias | G06F 12/08 |
| | | | | 718/1 |
| 11,745,732 | B2 | 9/2023 | Jackson et al. | |
| 2014/0282488 | A1* | 9/2014 | Tagliabue | G06F 8/62 |
| | | | | 717/174 |
| 2018/0096152 | A1* | 4/2018 | Martinez | G06F 21/575 |
| 2023/0004888 | A1* | 1/2023 | Li | G06V 30/412 |
| 2024/0296339 | A1* | 9/2024 | Zhang | G06N 20/00 |

OTHER PUBLICATIONS

Ramakrishna et al., "A methodology for automating assurance case generation" arXiv preprint arXiv:2003.05388 (Mar. 2020) pp. 1-14.
Schmidt K., Johns Hopkins University Applied Physics Laboratory, "Assurance Cases for Certification of Efficiently Learned Evaluated Rapidly and Automatically using Theory of Evidence (Accelerate)" (Nov. 2022) pp. 1-42.

(Continued)

*Primary Examiner* — Beemnet W Dada
(74) *Attorney, Agent, or Firm* — CANTOR COLBURN LLP

(57) ABSTRACT

An artificial-intelligence-assisted (AI-assisted) certification system includes an argumentation processor and an assurance case processor. The argumentation processor is configured to generate an argumentation pattern. The assurance case processor is configured to obtain the argumentation pattern from the argumentation processor, to automatically generate an assurance case based on one or more argumentation patterns, to determine evidence indicative of premises in the argumentation pattern, and to automatically assess the assurance case based on the evidence.

16 Claims, 11 Drawing Sheets

(56) References Cited

OTHER PUBLICATIONS

Wang et al., "Hierarchical contract-based synthesis for assurance cases" InNasa Formal Methods: 14th International Symposium, NFM 2022, Pasadena, CA, USA, May 24-27, 2022, https://doi.org/10.1007/978-3-031-06773-0_9 Abstract Only (2 pages).
Daw et al. "AACE: Automated assurance case environment for aerospace certification" 2023 IEEE/AIAA 42nd Digital Avionics Systems Conference (DASC). IEEE, Oct. 2023 (11 pages).
Search Report issued in European Patent Application No. 24203367.8; Date of Mailing Apr. 2, 2025 (8 pages).

\* cited by examiner

| ASSURANCE CASE SUMMARY | | | | |
|---|---|---|---|---|
| SEARCH | | | | |
| ▬ ARGUMENTS | < RETURN TO DASHBOARD | | | 600 |
| ⚷ ARGUMENTS TREE | RESULTS FROM CONFIDENCE ASSESSMENT | | | |
| ⚷ ARGUMENT STRUCTURE | CONFIDENCE ANALYSIS OF "BY_BINARY_ANALYSIS" (ACTUAL CONFIDENCE: 1.00) 604 | | | |
| ⚷ CONFIDENCE ASSESSMENT | NODE | TYPE | ACTUAL AVAILABILITY | SIMULATED AVAILABILITY | SENSITIVITY |
| ⚷ CONFIDENCE TREE | THE CWE IS MITIGATED OR PREVENTED BY THE RESULTS OF A CWE ANALYSIS ON THE BINARY | ARGUMENT | ☐ | | VALUE X.Y |
| ⊙ EVIDENCE | A CWE DETECTION PROCEDURE PERFORMED ON THE BINARY SHOWS THAT THE CWE DOES NOT EXIST | EVIDENCE | ☑ | ☑ | VALUE X.Y |
| ⊗ DEFEATERS | THE SOFTWARE MODULE IS CORRECT | SOURCE OF DOUBT | ☑ | | VALUE X.Y |
| | TRUE/FALSE, THE SPECIFICATIONS FOR A SOFTWAREMODULE IS CORRECT | SOURCE OF DOUBT | ☑ | | VALUE X.Y |
| | TRUE/FALSE, THE CODE FOR THE SOFTWARE MODULE EXISTS | SOURCE OF DOUBT | ☑ | | VALUE X.Y |
| | TRUE/FALSE, ACERT TOOL IS SOUND WHEN ANALYZING THE SPECIFIC CWE | | | | |
| | TEST SCENARIOS (SIMULATED CONFIDENCE: 1.00) SIMULATE CONFIDENCE CALCULATE ALL SENSITIVITIES | | | | |
| | BY_BINARY_ANALYSIS (1.0) | | | | |
| ◻ SELECT FOLDER | | | | | |

ARTIFICIAL-INTELLIGENCE-ASSISTED CERTIFICATION SYSTEM

STATEMENT OF FEDERAL SUPPORT

This invention was made with Government support under Contract FA8750-20-C-0508 awarded by the United States Defense Advanced Research Projects Agency. The Government has certain rights in the invention.

BACKGROUND

Exemplary embodiments of the present disclosure relate generally to certification of software and, in particular, to an artificial-intelligence-assisted certification system configured to evaluate software assurance evidence using assurance cases.

Aerospace software certification is the process by which software used in aerospace systems, such as aircraft and satellites, is evaluated and approved to meet specific safety and functionality criteria. The objective is to ensure the software functions correctly and safely, especially in scenarios where failures could result in significant harm or loss of life.

The certification process considers software's potential impact on safety, classifying it into different criticality levels. The higher the criticality, the more stringent the verification requirements. Comprehensive documentation is essential to provide evidence that standards are met and that the software has undergone thorough testing. Moreover, tools used in the development process might also need qualification, and regulatory agencies often oversee and audit these projects to ensure compliance and safety.

BRIEF DESCRIPTION

According to a non-limiting embodiment, an artificial-intelligence-assisted (AI-assisted) certification system includes an argumentation processor and an assurance case processor. The argumentation processor is configured to generate an argumentation pattern. The assurance case processor is configured to obtain the argumentation pattern from the argumentation processor, to automatically generate an assurance case based on one or more argumentation patterns, to determine evidence indicative of premises in the argumentation pattern, and to automatically assess the assurance case based on the evidence.

In addition to one or more of the features described above, or as an alternative to any of the foregoing embodiments, the argumentation processor comprises a pattern editor engine configured to generate a plurality of different argumentation patterns representing domain or subject matter expert knowledge; and an argumentation pattern library configured to store the plurality of different argumentation patterns, where the different argumentation patterns include the argumentation pattern obtained by the assurance case processor.

In addition to one or more of the features described above, or as an alternative to any of the foregoing embodiments, the pattern editor is configured to translate the argumentation pattern into a reusable expanded hierarchical-based argumentation pattern.

In addition to one or more of the features described above, or as an alternative to any of the foregoing embodiments, the reusable expanded hierarchical-based argumentation pattern includes at least one expanded claim, an expanded argument, and domain information.

In addition to one or more of the features described above, or as an alternative to any of the foregoing embodiments, the at least one expanded claim is defined by one or more defined claims and one or more restrictions, wherein the expanded argument is defined by one or more subclaims, the evidence, and a relationship between the subclaims and the evidence, and wherein the domain information defines at least one of a domain of the applicability of the software component, software, and a system component running the software.

In addition to one or more of the features described above, or as an alternative to any of the foregoing embodiments, the assurance case processor comprises an evidence reasoner component configured to receive lifecycle artifacts, and to determine the evidence based on the lifecycle artifacts; an assurance case generation component configured to generate at least one assurance case candidate based at least in part on the evidence and the argumentation pattern; and an assurance case assessment component configured to perform the at least one assurance case candidate so as to determine at least one valid assurance case and to provide risk/infeasibility information indicative of claim that a particular security control adequately mitigates certain identified risks of the at least one valid assurance case.

In addition to one or more of the features described above, or as an alternative to any of the foregoing embodiments, the assurance case generation component performs operations includes an assurance case synthesis operation configured to generate at least one initial assurance case candidate based on a top-level goal and system specifications; and a logical soundness analysis configured to determine at least one at least one final assessment candidate based on the at least one initial assurance case candidate. The assurance case processor automatically assess the at least one final assessment candidate based on the evidence.

In addition to one or more of the features described above, or as an alternative to any of the foregoing embodiments, the assurance case processor further comprises an evaluation graphical user interface (GUI) configured to visualize the at least one valid assurance case.

In addition to one or more of the features described above, or as an alternative to any of the foregoing embodiments, the visualized at least one valid assurance case includes combination of textual, graphical and tabular interfaces.

In addition to one or more of the features described above, or as an alternative to any of the foregoing embodiments, the evaluation GUI includes a dashboard with a changing display configured to display a summary of the assurance case, the summary including a goal of the assurance case, confidence assessment results, highlighted evidence that have a confidence level that is below a confidence threshold, and vetted sources for the argumentation pattern used in the creation of the assurance case.

According to another non-limiting embodiment, a method of automatically assessing an assurance case comprises generating, using an argumentation processor, to generate an argumentation pattern, and obtaining, by an assurance case processor, the argumentation pattern from the argumentation processor. The method further comprises automatically generating, by the assurance case processor, an assurance case based on one or more argumentation patterns; and determining, by the assurance case processor, evidence indicative of premises in the argumentation pattern, and to automatically assess the assurance case based on the evidence.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike:

FIG. 8 depicts an interactive confidence tree displayed by the GUI according to a non-limiting embodiment of the present disclosure.

Figure 1:
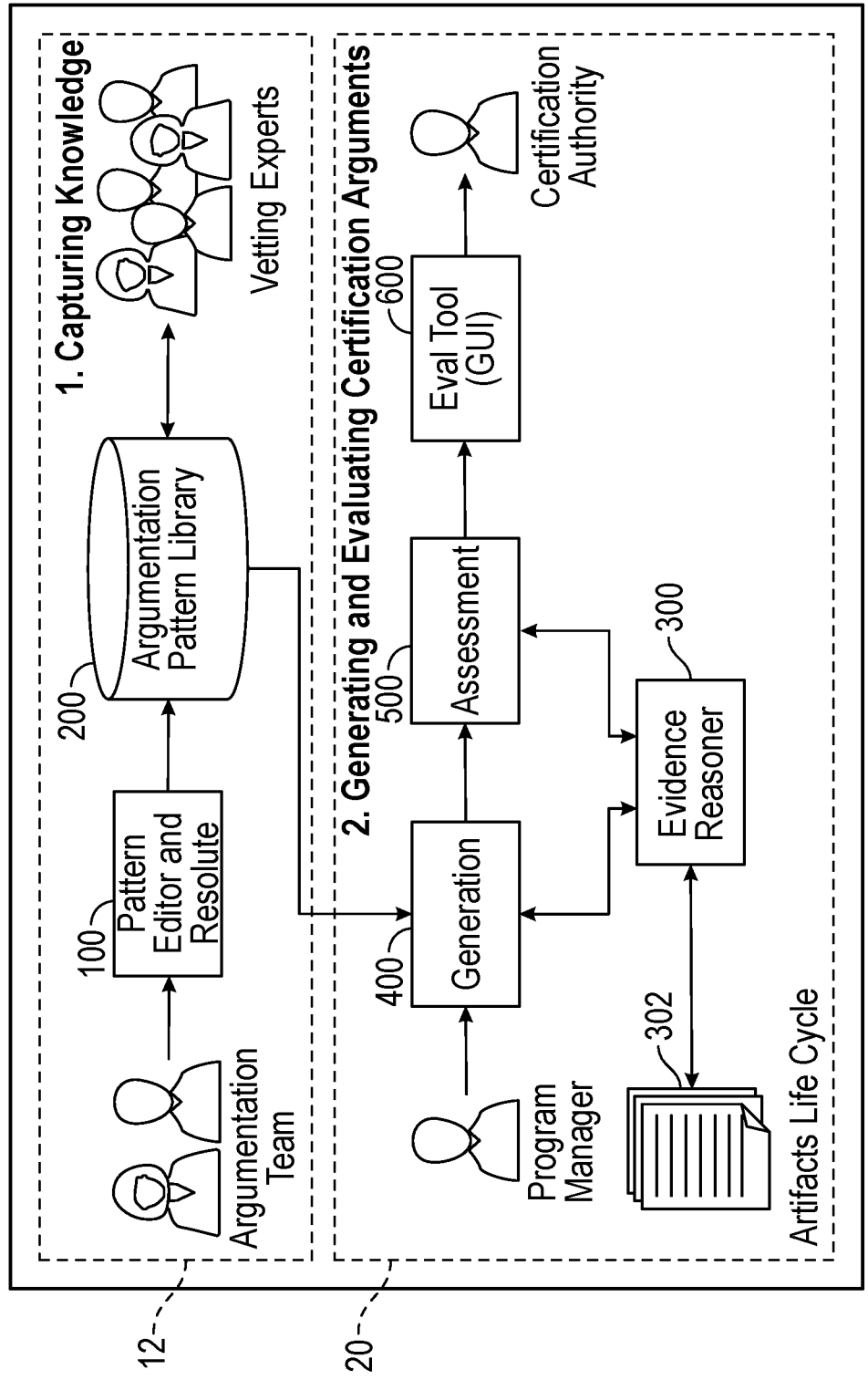
FIG. 1 is a diagram depicting an artificial-intelligence-assisted certification system according to a non-limiting embodiment of the present disclosure.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

Traditional software certification processes in aerospace and other safety-critical industries are often criticized for being excessively costly and rigid. The extensive documentation required not only adds to the costs but also makes the process labor-intensive, with a heavy emphasis on providing and managing paper-heavy evidence. Moreover, the process lacks flexibility as minor modifications in software can lead to a disproportionately lengthy and expensive re-certification, inhibiting quick enhancements or prompt resolutions to identified issues.

Another significant challenge arises when integrating emerging technologies like artificial intelligence (AI) and machine learning (ML). Traditional certification standards were established before the advent of these advanced technologies and might not adequately address their complexities, especially their non-deterministic behaviors. As AI and ML gain traction in aerospace applications, the industry grapples with the need for updated certification guidelines to handle their unique challenges while ensuring safety.

Recent software certification processes have incorporated the use of assurance cases (ACs) to enable certifiers or evaluators to streamline risk and certification analysis. Assurance cases are developed as structured arguments, often supported by evidence, which provide a clear justification that a specific system (or software) meets its safety, security, or reliability requirements. The defined context, modularity, traceability, and ease of peer review within assurance cases allow evaluators to rapidly understand the safety justification, ensuring a comprehensive assessment of the system's risk and determining its acceptability with greater speed and clarity.

Assurance cases, while offering structured safety justifications, present challenges when integrated into software certification processes. Their complexity can be significant, especially for intricate systems, and the subjectivity in some arguments can introduce ambiguities. In addition, creating and maintaining assurance cases can demand substantial resources, and keeping them updated with system evolution can be challenging. The absence of universal standards can lead to inconsistencies creating steep learning curves, workflow disruptions, and scalability issues for vast or rapidly changing systems.

Various non-limiting embodiments described herein provide an artificial-intelligence-assisted (AI-assisted) certification system. The AI-assisted certification system employs hierarchical contract networks (HCNs) to formalize arguments and confidence networks configured to generate subjective notions of probability/belief and quantitatively reason about the confidence in assertions affected by uncertainty. The AI-assisted certification system, called an Automatic Assurance Case Environment (AACE) utilizes the assurance case patterns (ACPs), which are represented by a combination of HCNs (assurance patterns) and confidence pattern networks to automatically synthesize, validate, and assess assurance cases. Given a collection of assurance case candidates in a HCN and a library of confidence networks to capture the sources of HCN predicate uncertainty, the AI-assisted certification system can efficiently orchestrate logic and probabilistic reasoning to validate candidate soundness and quantify its confidence via one or more satisfiability modulo theories (SMT) problems.

In one or more non-limiting embodiments, the AI-assisted certification system synthesizes assurance case candidates in the form of an HCN based on a top-level claim, the system under assurance, relevant system context, and an ACP library.

The AI-assisted certification system can also validate the soundness of AC candidates and quantifies their confidence based on available evidence. According to a non-limiting embodiment, the AI-assisted certification system includes an evidence manager (EM) configured to gather and distribute supporting evidence from a curation tool/database. The evidence manager supports appropriate evidence ontology that defines key software certification concepts (e.g., component, requirement, and test terms), handles evidence requests from the assurance case generation and assessment components, constructs evidence queries to an evidence curation tool, and is capable of retrieving evidence directly by querying a system architecture model for evidence.

In one or more non-limiting embodiments, the AI-assisted certification system provides translation engines and user interfaces that assist certifying authorities to make informed decisions. The user interfaces can include, for example, a hybrid user interface configured to visualize assurance case and evaluation via the combination of text and graphics, to graphically visualize the high-level architecture of assurance cases, and provide tabular menu entries that list assurance cases, evidence, defeaters, atomic arguments, argument structures, and view-oriented evaluation visualizations.

With reference now to FIG. 1, an artificial-intelligence-assisted (AI-assisted) certification system 10 is depicted according to a non-limiting embodiment of the present disclosure. As described herein the AI-assisted) certification system 10 is capable of providing various novel features such as, for example, (a) utilize hierarchical contract networks (HCNs) to represent an argument and confidence networks to formalize subjective notions of probability and quantitatively reasoning about the confidence in assertions affected by uncertainty; (b) synthesize assurance case candidates in the form of HCN based on a top-level claim, the system under assurance, a relevant system context, and an assurance case library; (c) validate the soundness of assurance case candidates and quantifies corresponding confidence levels of validity based on available evidence; and (d) provide translation engines and user interfaces that help certification authorities make informed decisions.

The AI-assisted certification system 10 includes an assurance case argumentation processor 12 and an assurance case processor 20. The assurance case argumentation processor 12 is configured to generate an assurance case argumentation pattern (simply referred to as an argumentation pattern), which is used to generate an assurance case as described in detail below. The assurance case argumentation processor 12 includes a pattern editor engine 100, and an argumentation pattern library 200.

The pattern editor engine 100 is configured to generate a hierarchical contract network (HCN) argumentation pattern 102 representing domain or subject matter expert knowledge. According to a non-limiting embodiment, the subject matter expert knowledge can be provided by experts or users.

Figure 2:
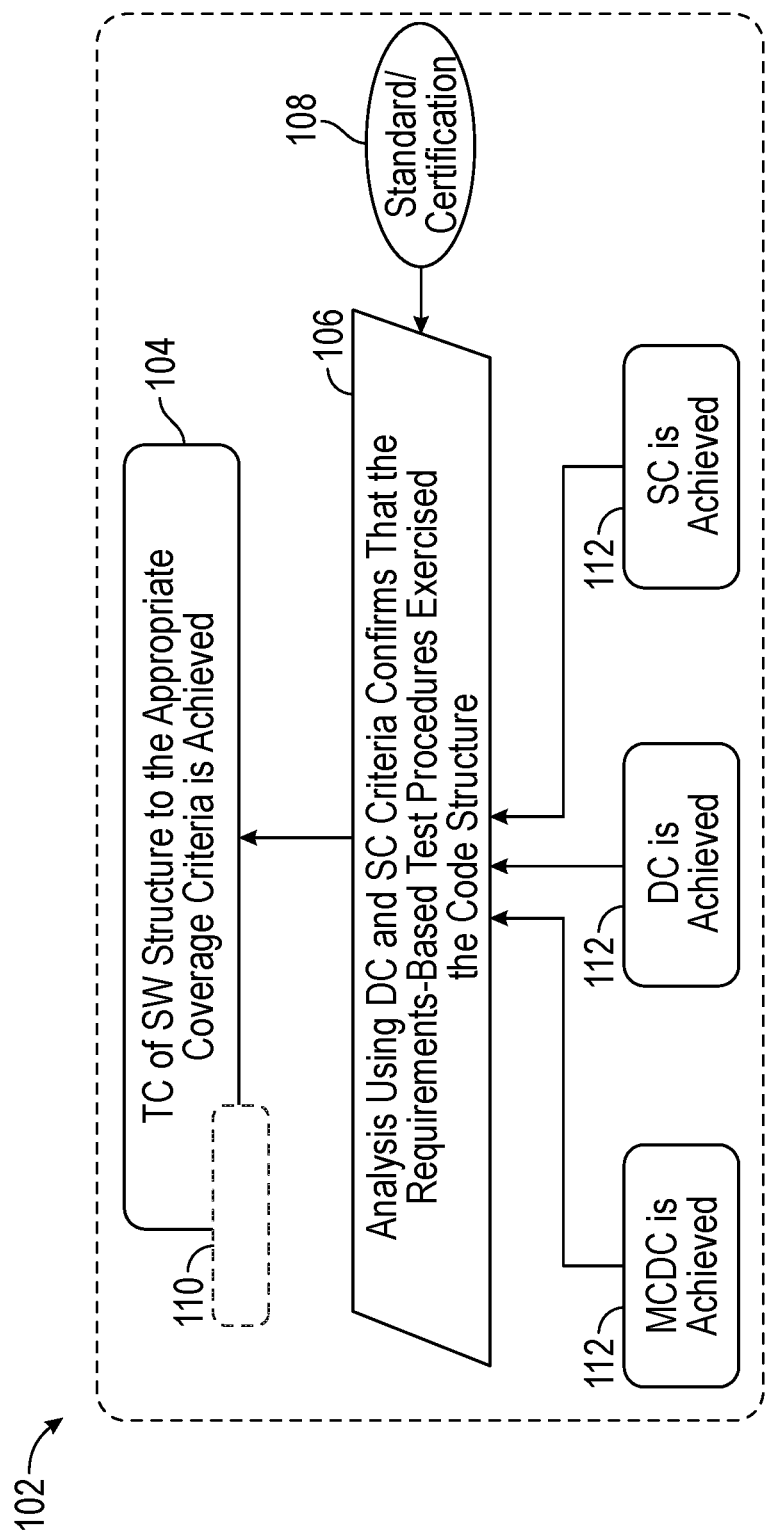
FIG. 2. depicts an example of an argumentation pattern according to a non-limiting embodiment of the present disclosure.

FIG. 2 depicts an example of an argumentation pattern 102. The argumentation pattern 102 includes a claim 104, an argument 106, a context or assumption 108, a domain of applicability 110, and evidence 112. The claim 104 can be referred to as an asserted test coverage of a structure of the software, e.g., structural coverage of a software has been achieved to a target coverage level. Evidence 112 supporting the structural coverage has been achieved is obtained from software process testing. The evidence can include, but is not limited to, decision coverage (DC) evidence, statement coverage (SC) evidence, and modified condition/decision coverage (MCDC) evidence. The argument 106 identifies why the evidence 112 supports the claim 102. The context or assumption 108 can be provided to indicate the argument 106 is in the context to a particular certification standard, and the domain of applicability 110 can be provided to indicate the software applies to a particular criticality level.

Figure 3:
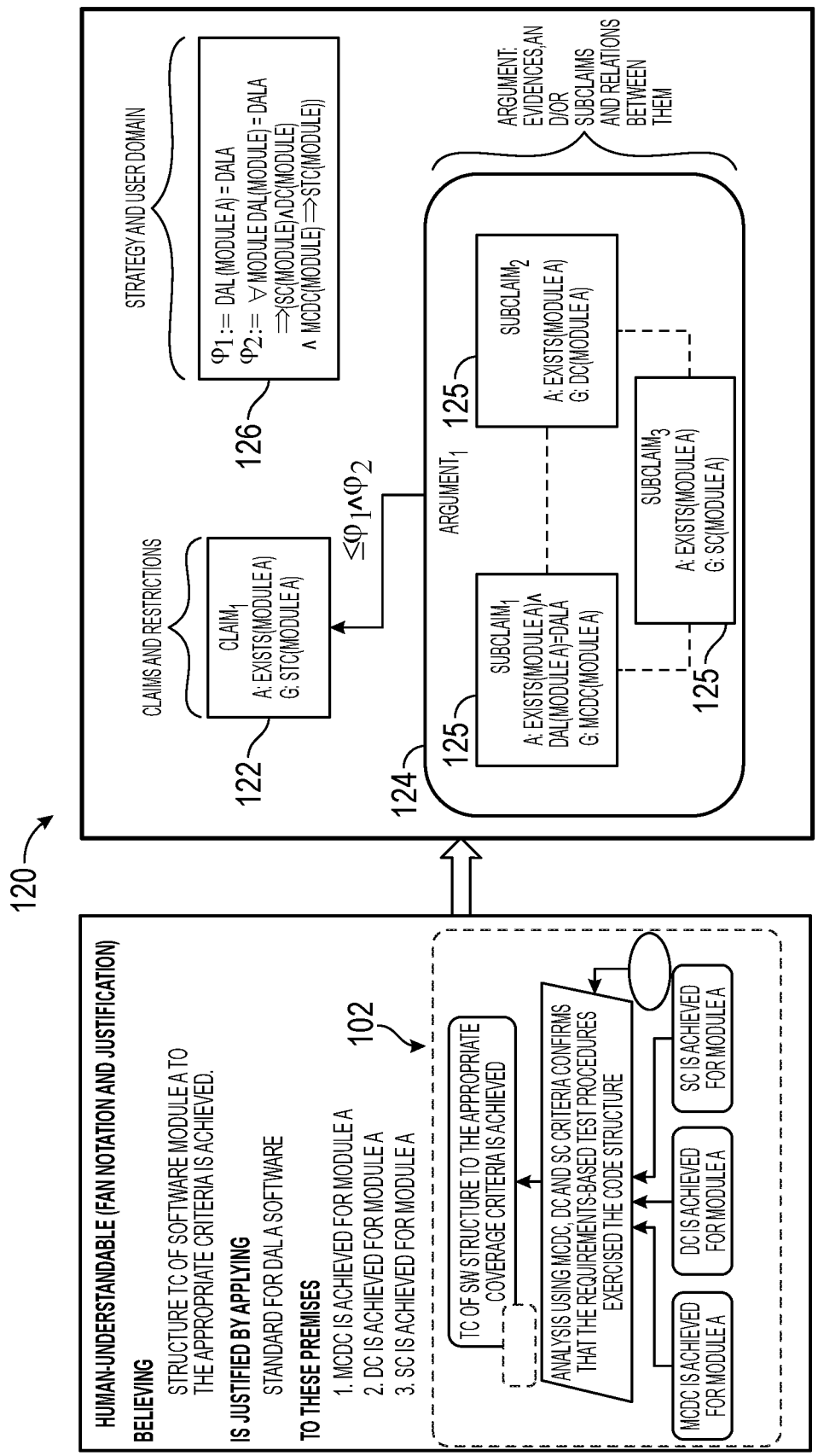
FIG. 3 depicts an expanded argumentation pattern that defines a reusable hierarchical contract-based argumentation pattern according to a non-limiting embodiment of the present disclosure.

The pattern editor 100 can translate an argumentation pattern 102 into a reusable expanded hierarchical-based argumentation pattern 120, as shown in FIG. 3. The expanded hierarchical contract-based argumentation pattern 120 can include at least one expanded claim 122, an expanded argument 124, and a strategy/user domain information 126. The Expanded claim 122 is defined by one or more defined claims and one or more restrictions. The expanded argument 124 is defined by one or more subclaims 125, evidence, and a relationship between the subclaims and the evidence. The strategy/user domain 126 defines the domain of the applicability of the software component, the software, and/or the system component running the software.

Figure 4:
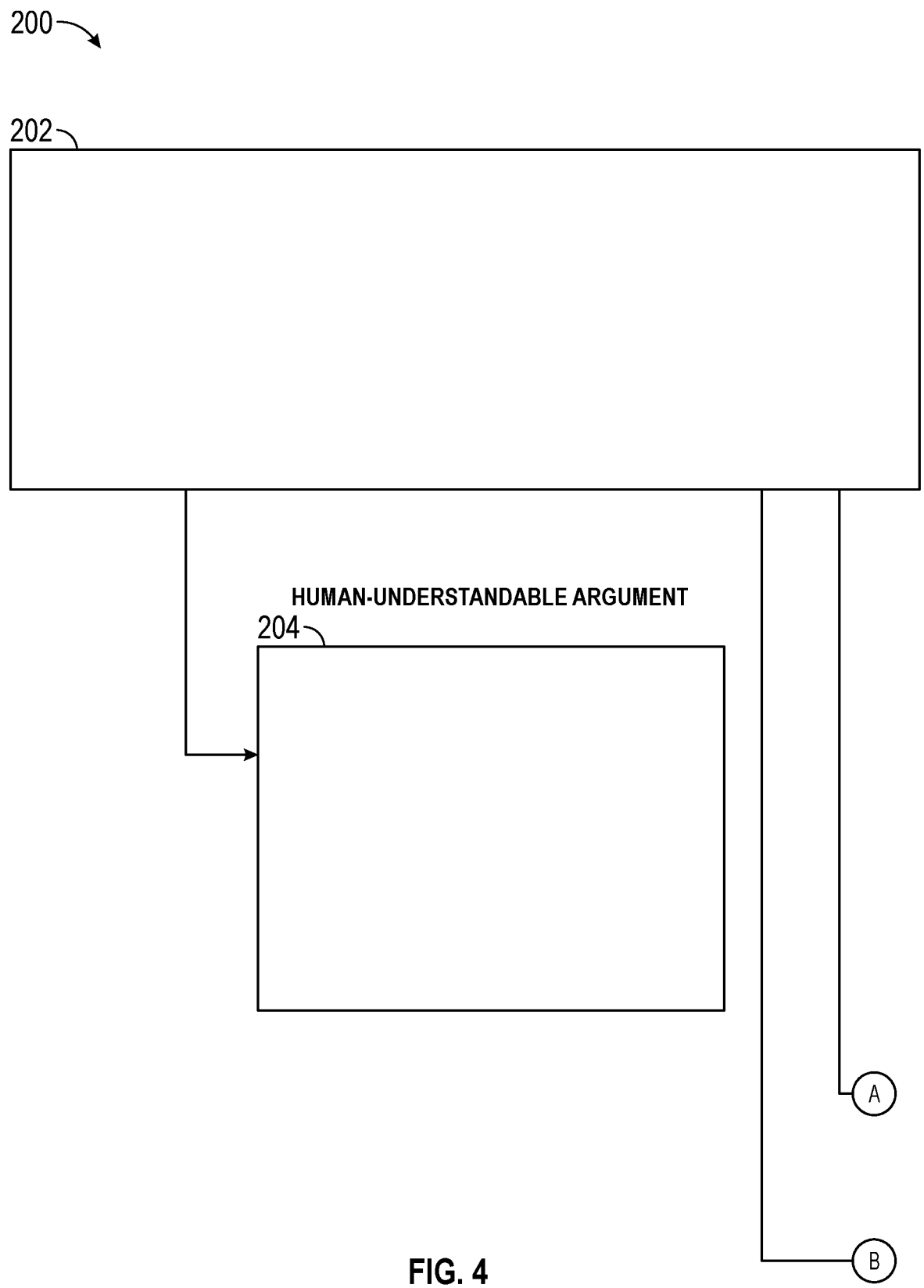
FIG. 4 is a diagram depicting an argumentation pattern library (a database of argumentation patterns) according to a non-limiting embodiment.
Figure 4:
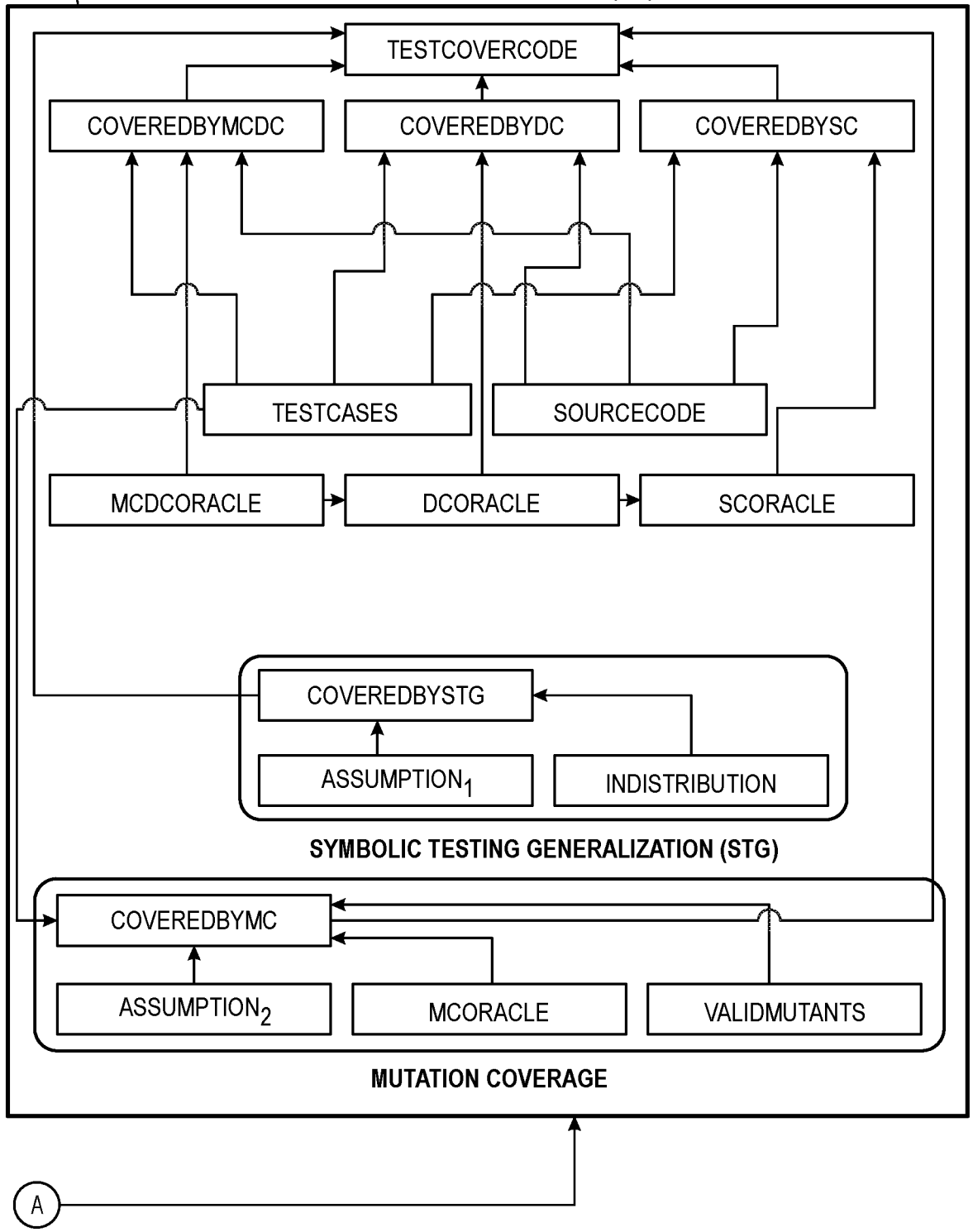
Figure 4:
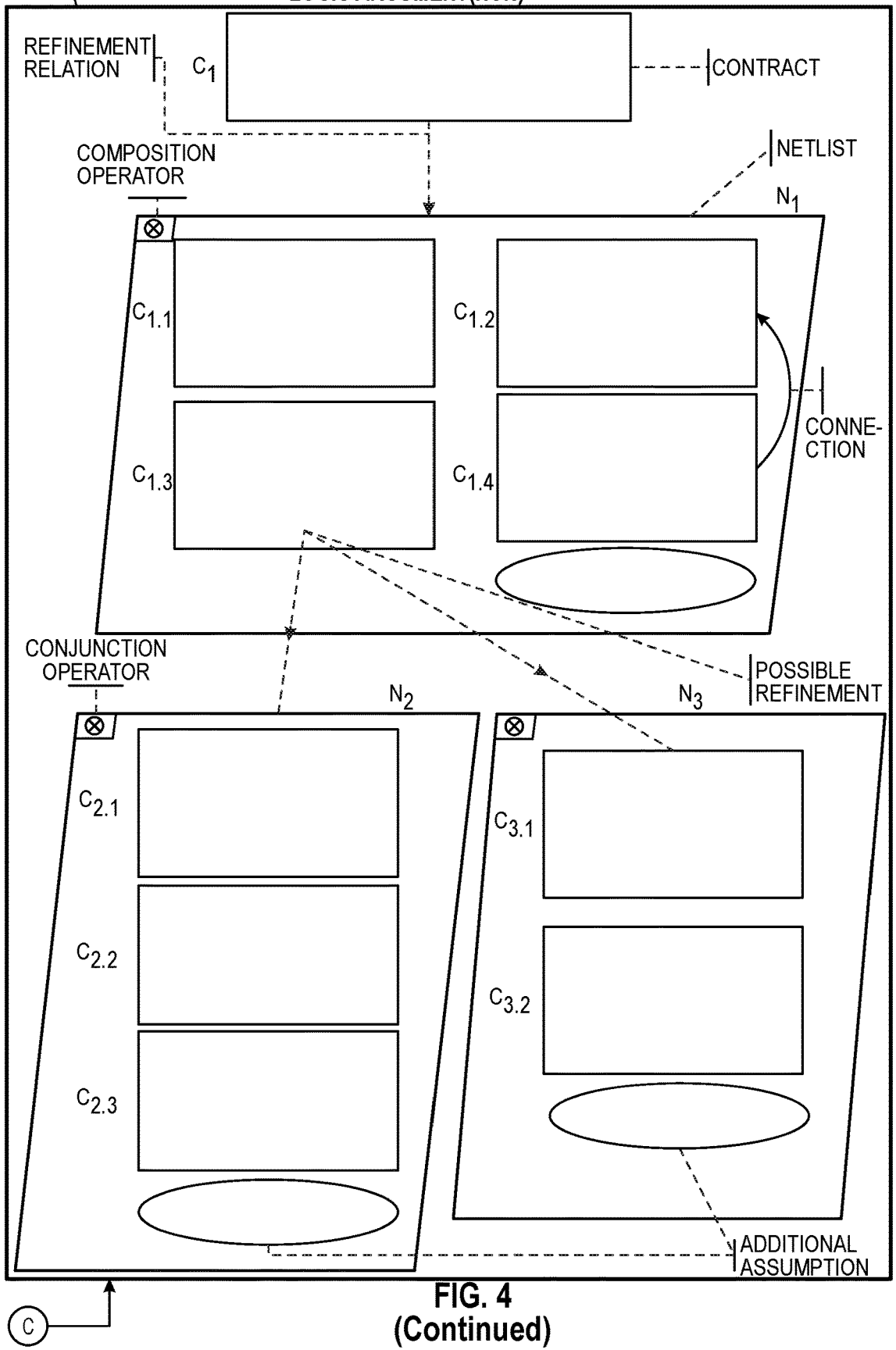

Referring to FIG. 4, an example diagram of the argumentation pattern library 200 is illustrated according to a non-limiting embodiment. The argumentation pattern library 200 is configured to store hierarchical contract-based argumentation pattern 120 as software code in the pattern editor language (Resolute). The argumentation pattern can be translated and displayed in a human-understandable argument 204 of the argumentation pattern 102, and in an HCN representation 206 of the argumentation pattern 102. The final piece of the argumentation pattern 102 is the Bayesian networks (BN) representation of the confidence argument 208.

Referring again to FIG. 1, the assurance case processor 20 is configured to automatically evaluate software assurance evidence and automatically create/validate/assess assurance cases based on one or more argumentation patterns 102 to support the evaluators in performing software certification. The assurance case processor 20 includes an evidence reasoner component 300, an assurance case generation component 400, an assurance case assessment component 500, and an evaluation graphical user interface (GUI) 600.

The evidence reasoner component 300 is configured to receive lifecycle artifacts 302, and to determine raw evidence indicative of premises in the argumentation patterns 102 based on the lifecycle artifacts 302. The evidence reasoner component 300 can provide varied evidence sources and also some pre-analysis to identify inconsistencies and conflicts in the raw evidence. The lifecycle artifacts can include, for example: evidence determined from an ontology-based database, where the evidence are organized by an ontology of key software certification concepts including, but not limited to, components, requirements, and tests. In one or more non-limiting embodiments, the evidence is determined by extracting heterogenous evidence from raw evidence, capturing an ontology of evidentiary properties of the system used to run the software, and defining the extracted evidence as premises in the argumentation pattern 102.

Figure 5:
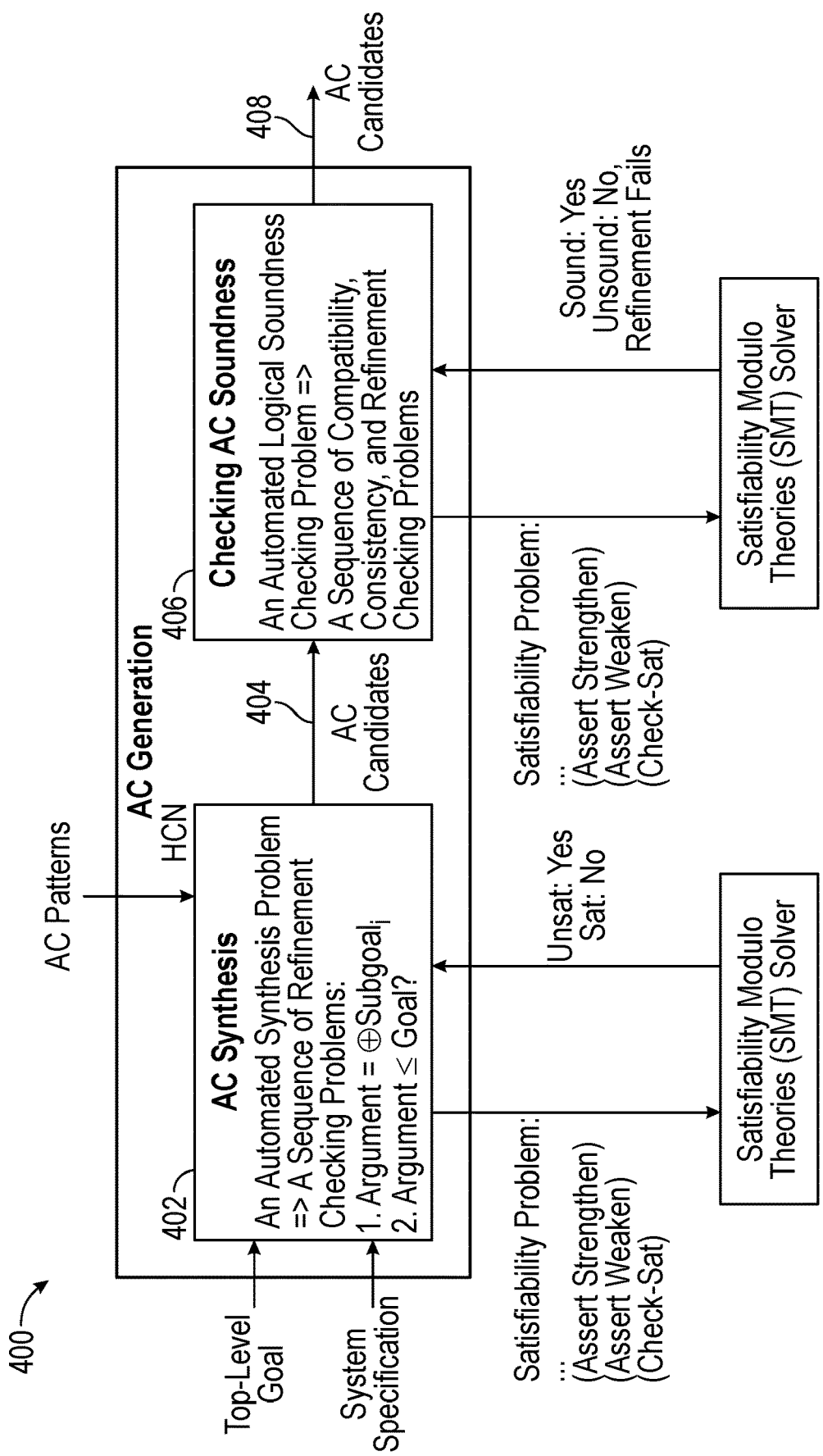
FIG. 5 depicts operations performed by an automatic assurance case generation component according to a non-limiting embodiment of the present disclosure.

The assurance case generation component 400 is configured to generate at least one assurance case candidate based at least in part on the extracted evidence and at least one argumentation pattern obtained from the argumentation library 200. Turning to FIG. 5, for example, the assurance case generation component 400 performs: (a) an assurance case synthesis operation 402 to generate at least one initial assurance case candidate 404; and (b) a logical soundness analysis 406 of at least one initial assurance case to determine at least one final assurance case candidate 408. The assurance case synthesis operation 402 takes as inputs a top-level goal, and properties of the system (e.g., system specification), and the argumentation pattern(s), and then generates one or more satisfiability modulo theories (SMT) problems that are resolved by a SMT solver. The logical soundness analysis 406 is based on a sequence of compatibility analysis, consistency analysis, and refinement checking that are also resolved by a SMT solver.

Figure 6:
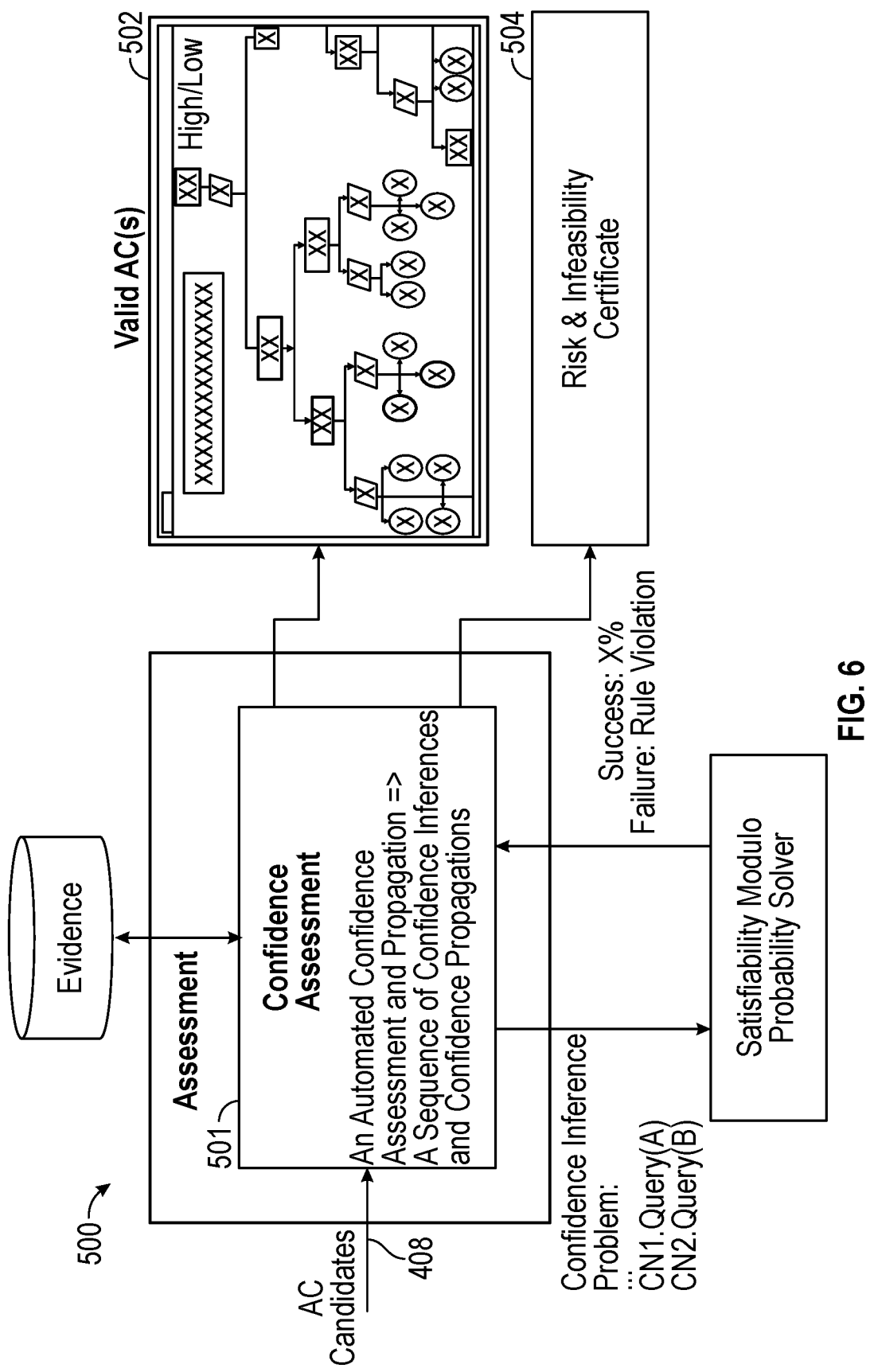
FIG. 6 depicts operations performed by an automatic assurance case assessment component according to a non-limiting embodiment of the present disclosure.

The assurance case assessment component 500 is configured to perform an assessment of a least one final assessment candidate 408 so as to determine at least one valid assurance case 502 and to provide risk/infeasibility information 504. As shown in FIG. 6, for example, assurance case assessment component 500 can receive one or more of the final assurance case candidates 408 and perform an automated confidence assessment and propagation sequence 501. The results of the confidence assessment is a decision plus confidence score indicating how much confidence could be placed on the top-goal of the assurance case. For example, a probability value of 1.00 is indicative of high or maximum confidence while a probability value of 0.00 is indicative of low or minimum confidence. Accordingly, a probability value closer to 1.00 means a higher confidence on the claim compared to a probability value closer to 0.00. Based on the probability value, the assurance case assessment component 500 outputs one or more assurance cases 502, along with their respective risk and infeasibility information 504. The rise and infeasibility information 504 can be indicative of an effectiveness statement, i.e., a claim that a particular security control adequately mitigates certain identified risk.

Referring again to FIG. 1, the 20 can include an evaluation graphical user interface (GUI) 600. The evaluation GUI 600 is configured to visualize at least one valid assurance case and the evaluation displays at least one valid assurance case via a combination of textual, graphical and tabular interfaces. The visualization and the evaluation can include a high-level graphical visualization of the architecture of assurance cases. The visualization can also include displaying tabular menu entries that lists the assurance case, corresponding evidence, defeaters, an atomic argument visualization, an argument structure, and a view-oriented evaluation visualization.

Figure 7:
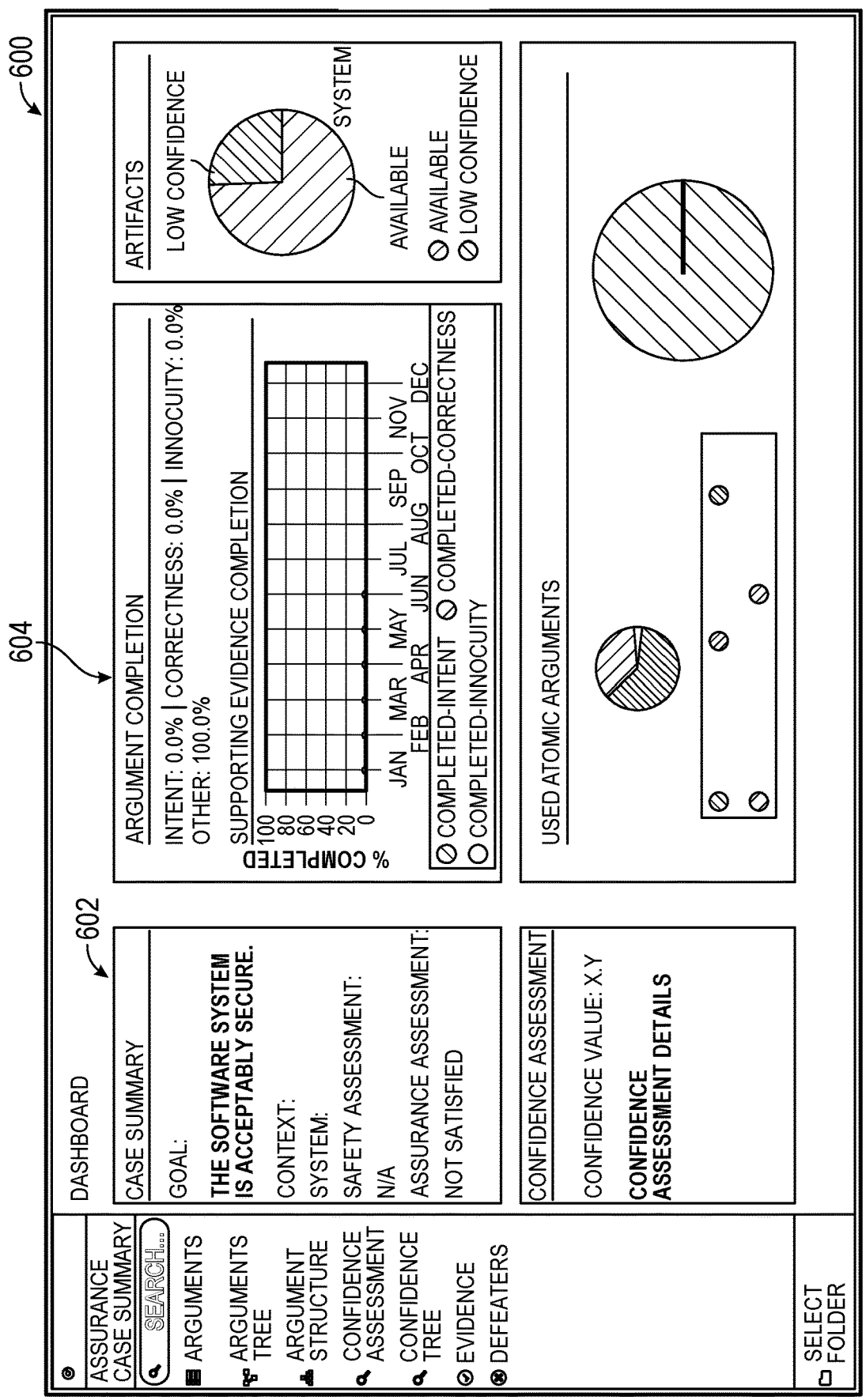
FIG. 7 depicts an assurance case evaluation graphical user interface (GUI) according to a non-limiting embodiment of the present disclosure.

FIG. 7 depicts the evaluation GUI 600 according to a non-limiting embodiment. The evaluation GUI 600 includes a dashboard 602 with a changing display 604 that can summarize one or more valid assurance cases. The summary can include, but is not limited to, the top goal, the confidence assessment results, the contexts, the percentage of evidence or highlighted evidence in the assurance case that are of low confidence (e.g., a confidence level that is below a confidence threshold), the creation and vetted sources for the argument(s) (e.g., one or more argumentation patterns) used in the creation of the assurance case.

As described herein, a user (e.g., a certifying authority entity) can manipulate the dashboard to display different views. The views include, but are not limited to: (a) a summary view displaying high-level information, including a summary entry links to a detailed view and a tabular listing of evidence names, locations, availability, confidences, and applied arguments; an atomic argument view displaying a tabular form in an annotated hierarchy with detailed textual description; and an argument structure view displaying a graphical architectural representation of at least one valid assurance case.

The evaluation GUI 600 can also provide an interactive interface to the user. As shown in FIG. 8, for example, the evaluation GUI 600 can include an interactive confidence view, which allows the user to probe and simulate the confidence networks used in the confidence assessment.

Figure 9:
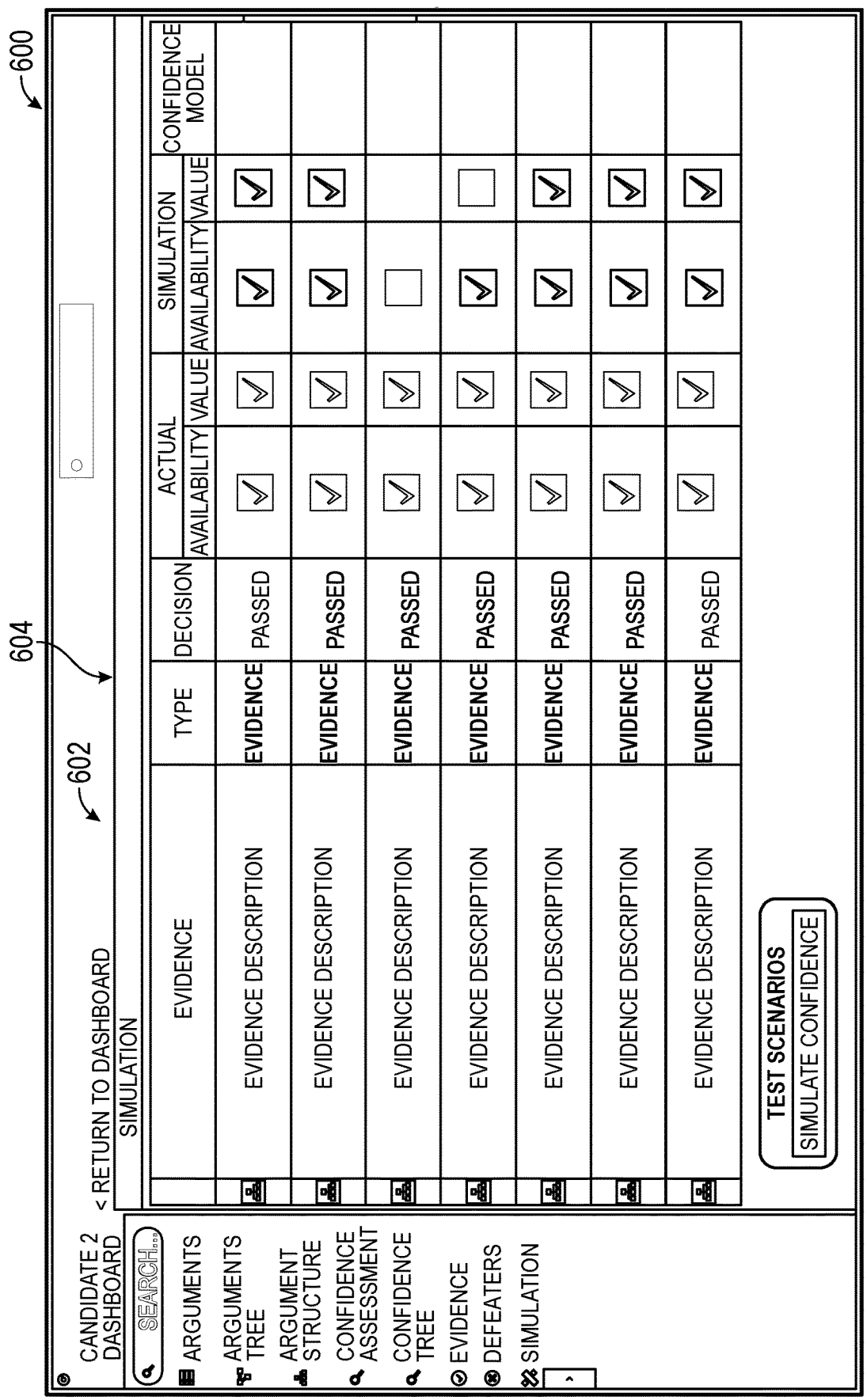
FIG. 9 depicts an simulation interface displayed by the GUI according to a non-limiting embodiment of the present disclosure.

As shown in FIG. 9, the evaluation GUI 600 is configured to display an expanded simulation interface including: (a) simulate a what-if scenario i.e. what is the confidence of the assurance case if the evidence were modified; (b) allowing a user to change both the value and availability of the evidence; and (c) allowing a user to change the evidence of arbitrary types.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An artificial-intelligence-assisted (AI-assisted) certification system comprising:
an argumentation processor configured to generate an argumentation pattern; and
an assurance case processor configured to obtain the argumentation pattern from the argumentation processor, to automatically generate an assurance case based on one or more argumentation patterns, determine evidence indicative of premises in the argumentation pattern, and to automatically assess the assurance case based on the evidence,
wherein the argumentation processor comprises:
a pattern editor engine configured to generate a plurality of different argumentation patterns representing domain or subject matter expert knowledge and to translate the argumentation pattern into a reusable expanded hierarchical-based argumentation pattern; and
an argumentation pattern library configured to store the plurality of different argumentation patterns, the different argumentation patterns including the argumentation pattern obtained by the assurance case processor.

2. The AI-assisted certification system of claim 1, wherein the reusable expanded hierarchical-based argumentation pattern includes at least one expanded claim, an expanded argument, and domain information.

3. The AI-assisted certification system of claim 2, wherein the at least one expanded claim is defined by one or more defined claims and one or more restrictions, wherein the expanded argument is defined by one or more subclaims, the evidence, and a relationship between the subclaims and the evidence, and wherein the domain information defines at least one of a domain of the applicability of the software component, software, and a system component running the software.

4. The AI-assisted certification system of claim 1, wherein the assurance case processor comprises:
an evidence reasoner component configured to receive lifecycle artifacts, and to determine the evidence based on the lifecycle artifacts;
an assurance case generation component configured to generate at least one assurance case candidate based at least in part on the evidence and the argumentation pattern;
an assurance case assessment component configured to perform the at least one assurance case candidate so as to determine at least one valid assurance case and to provide risk/infeasibility information indicative of claim that a particular security control adequately mitigates certain identified risks of the at least one valid assurance case.

5. The AI-assisted certification system of claim 4, wherein the assurance case generation component performs operations including:
- an assurance case synthesis operation configured to generate at least one initial assurance case candidate based on a top-level goal and system specifications; and
- a logical soundness analysis configured to determine at least one at least one final assessment candidate based on the at least one initial assurance case candidate,
- wherein the assurance case processor automatically assess the at least one final assessment candidate based on the evidence.

6. The AI-assisted certification system of claim 1, wherein the assurance case processor further comprises an evaluation graphical user interface (GUI) configured to visualize the at least one valid assurance case.

7. The AI-assisted certification system of claim 6, wherein the visualized at least one valid assurance case includes combination of textual, graphical and tabular interfaces.

8. The AI-assisted certification system of claim 7, wherein the evaluation GUI includes a dashboard with a changing display configured to display a summary of the assurance case, the summary including a goal of the assurance case, confidence assessment results, highlighted evidence that have a confidence level that is below a confidence threshold, and vetted sources for the argumentation pattern used in the creation of the assurance case.

9. A method of automatically assessing an assurance case, the method comprising:
- generating, using an argumentation processor a plurality of different argumentation patterns representing domain or subject matter expert knowledge;
- translating, by the pattern editor, at least one of the plurality of different argumentation patterns into a reusable expanded hierarchical-based argumentation pattern;
- storing the plurality of different argumentation patterns in an argumentation pattern library, the different argumentation patterns including the argumentation pattern obtained by the assurance case processor;
- obtaining, by an assurance case processor, or more of the argumentation patterns from the argumentation processor;
- automatically generating, by the assurance case processor, an assurance case based on the one or more argumentation patterns; and
- determining, by the assurance case processor, evidence indicative of premises in the one or more argumentation patterns, and to automatically assess the assurance case based on the evidence.

10. The method of claim 9, wherein the reusable expanded hierarchical-based argumentation pattern includes at least one expanded claim, an expanded argument, and domain information.

11. The method of claim 10, wherein the at least one expanded claim is defined by one or more defined claims and one or more restrictions, wherein the expanded argument is defined by one or more subclaims, the evidence, and a relationship between the subclaims and the evidence, and wherein the domain information defines at least one of a domain of the applicability of the software component, software, and a system component running the software.

12. The method of claim 9, further comprising:
- receiving, by an evidence reasoner component, lifecycle artifacts;
- determining, by the evidence reasoner component, the evidence based on the lifecycle artifacts;
- generating, by an assurance case generation component, at least one assurance case candidate based at least in part on the evidence and the argumentation pattern;
- performing, by an assurance case assessment component, the at least one assurance case candidate so as to determine at least one valid assurance case; and
- outputting, from the assurance case assessment component, risk/infeasibility information indicative of claim that a particular security control adequately mitigates certain identified risks of the at least one valid assurance case.

13. The method of claim 12, further comprising performing, by the assurance case generation component, operations including:
- an assurance case synthesis operation configured to generate at least one initial assurance case candidate based on a top-level goal and system specifications;
- a logical soundness analysis configured to determine at least one at least one final assessment candidate based on the at least one initial assurance case candidate, the assurance case including the at least one final assessment candidate, and
- automatically assessing the at least one final assessment candidate based on the evidence.

14. The method of claim 9, further comprising visualizing the at least one valid assurance case using an evaluation graphical user interface (GUI).

15. The method of claim 14, wherein the visualized at least one valid assurance case includes combination of textual, graphical and tabular interfaces.

16. The method of claim 15, further comprising displaying, via a dashboard, a summary of the assurance case, the summary including a goal of the assurance case, confidence assessment results, highlighted evidence that have a confidence level that is below a confidence threshold, and vetted sources for the argumentation pattern used in the creation of the assurance case.

* * * * *